Oct. 9, 1928.
P. W. LEHMAN
1,687,373
TIRE BUILDING MACHINE
Filed June 4, 1926
2 Sheets-Sheet 1
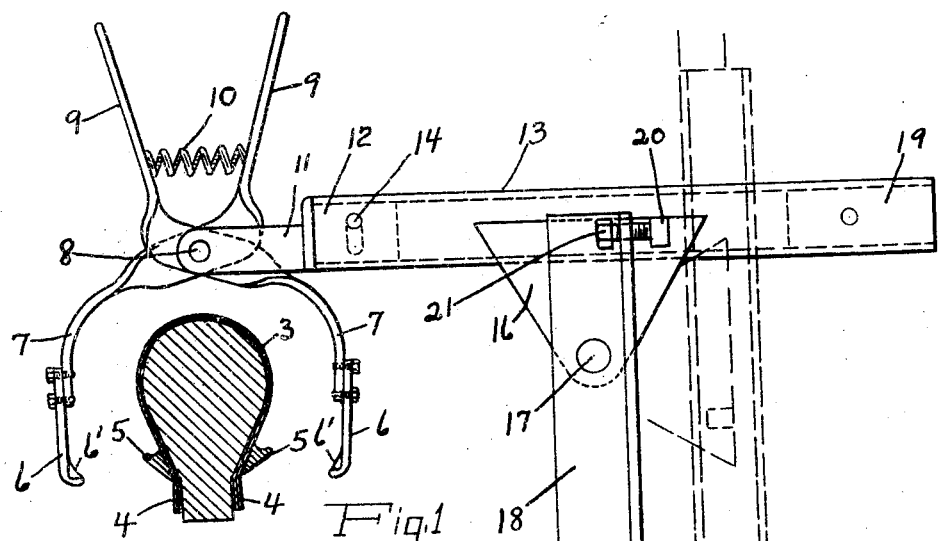
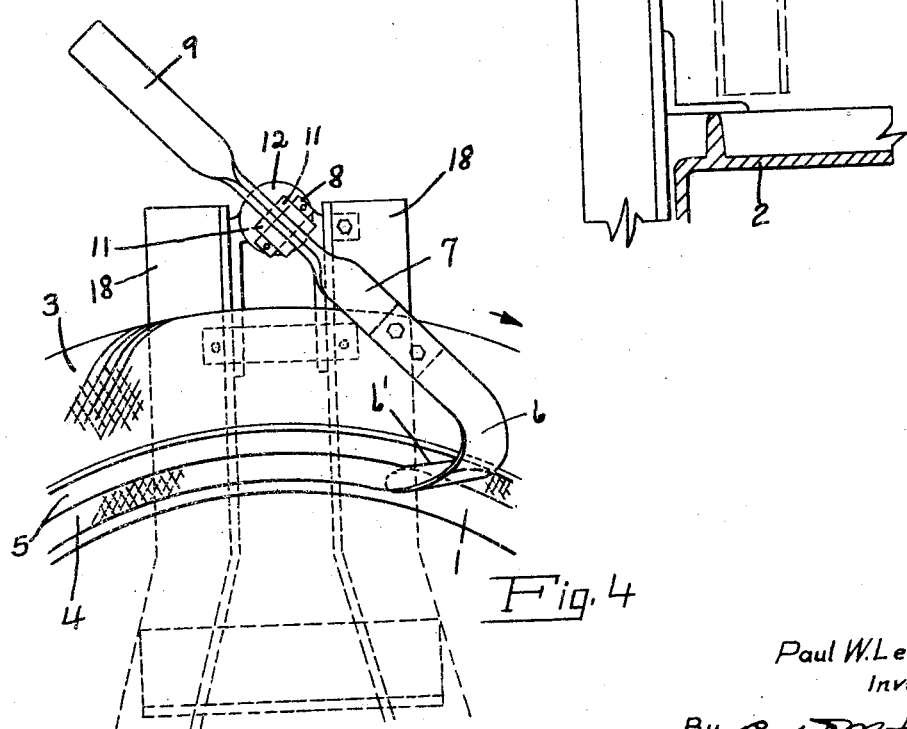
Paul W. Lehman
Inventor
By *[signature]*
Attorney

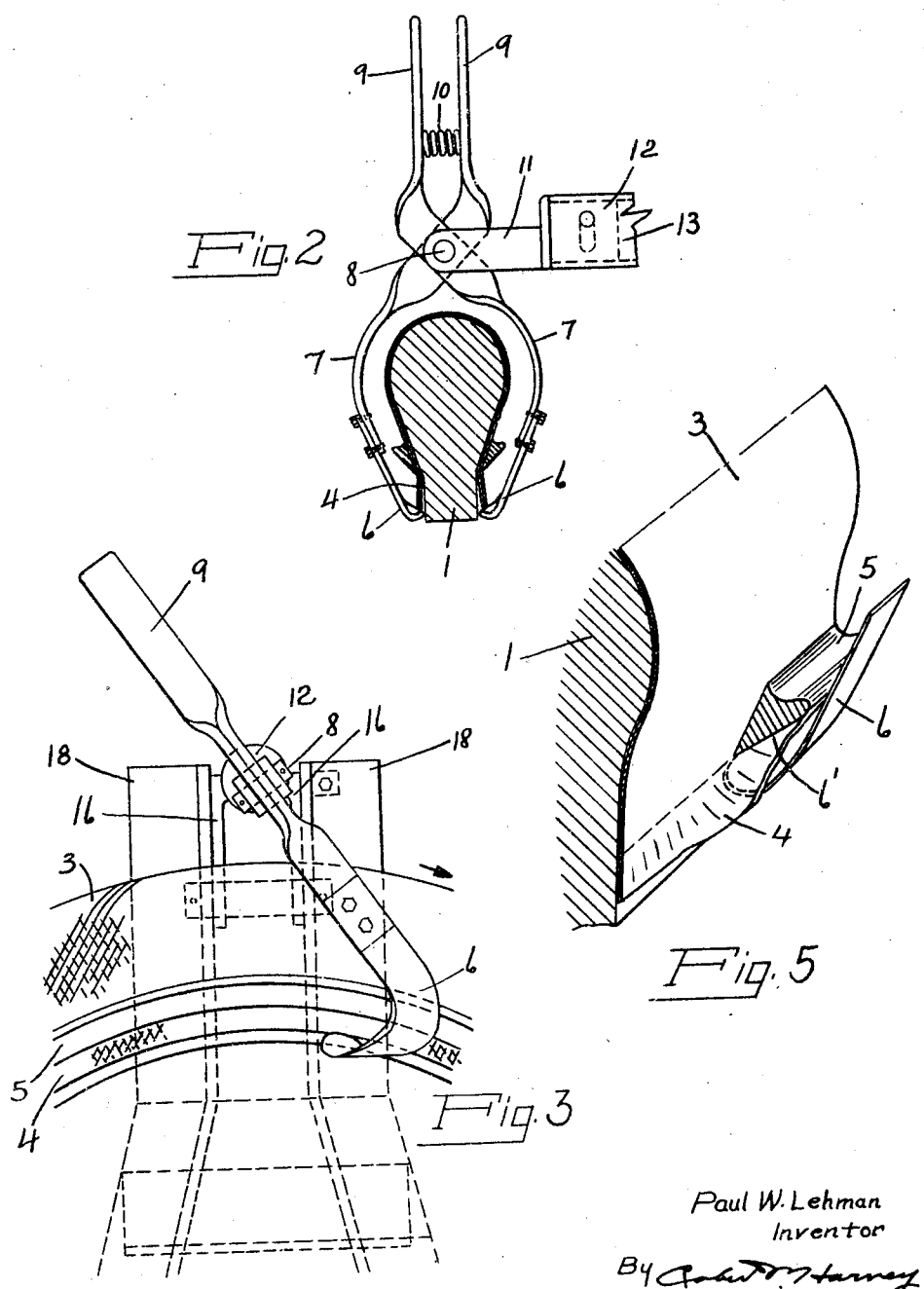

Patented Oct. 9, 1928.

1,687,373

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TIRE-BUILDING MACHINE.

Application filed June 4, 1926. Serial No. 113,705.

My invention relates to machines for building pneumatic tire casings and more particularly to a device for turning the edges of certain of the plies of carcass fabric outwardly and back against the face of the bead. According to one method of building such casings certain of the plies of fabric, usually the first or inner plies, are of a width such that when the plies have been laid around the building core, the edges extend radially beyond the bead position. After the bead cores have been placed in position these edges are turned back against the outside face of the beads. As far as I am aware this operation has heretofore been performed by means of a hand tool and as a separate operation on each side of the core. It is an object of my invention to provide a device, forming part of the tire building machine, which will turn back the plies on both sides of the building core simultaneously and without reliance on the skill of the operator. Other and further objects will be apparent from the following specification and claims.

In the accompanying drawings which illustrate one embodiment of my invention,

Figure 1 is a front view of the device with the parts in inoperative position,

Figure 2 is a similar view with the parts in position to start the operation,

Figure 3 is a side view corresponding to Figure 2,

Figure 4 is a side view showing the parts in operative position and

Figure 5 is a diagrammatic perspective view, showing the manner in which the ply edges are turned back about the bead core.

Referring to the drawings 1 designates the rotatable core of a tire building machine a portion of the frame of which is shown at 2, and 3 conventionally indicates the first plies of carcass material, such as cord or square woven fabric, which has been shaped or otherwise formed on the building core in any approved manner. As is clearly shown in the drawings the edge portions 4 of plies 3 extend below the bead cores, indicated at 5. The devices for turning portions 4 about the beads comprise hook shaped folding members 6, having bead engaging edges $6^1$, suitably secured to, or formed integral with, arms 7 which are pivoted together at 8, and are extended to form handles 9. Arms 7 are normally maintained in the position shown in Figure 1 by a compression spring 10 inserted between handles 9. Pivot 8 is journaled in spaced brackets 11 secured to the end of a stub 12 mounted for limited rotation, in the plane of the core, at the end of a tubular arm 13 by means of a pin and slot connection 14. Arm 13 is provided with depending members 16 pivoted at 17 between uprights 18 suitably secured to frame 1 of the building frame. Arm 13 is preferably counterweighed at 19 and when not in use arm 13 and the instrumentalities carried thereby may be swung about pivot 17 to the dotted line position of Figure 1 to leave the core 1 unobstructed for other operations. One of the members 16 is provided with a lug 20 engaging a bolt 21 threaded in the flange of one of the uprights 18 to form an adjustable stop to position members 6 in desired relation to the beads 5.

The operation is as follows: With the core 1 in rotation and the parts in the position shown in Figure 1, members 6 being depressed as far as pin 14 will permit, the operator presses handles 9 together bringing members 6 against the core just below the depending portions 4 of the carcass plies, as shown in Figure 2. Handles 9 are then swung backwardly raising members 6, still in contact with the core, to the position shown in Figures 4 and 5. As best shown in Figure 5 the hook portions of members 6 pass between the edge portions 4 and the core as the members are swung upwardly, turning the edge portion 4 outwardly from the core. The bead engaging edges $6^1$ of the hooks press the portions 4 against the face of the bead and in this position act as plows to uniformly lay the portions 4 back against the outer face of the bead as the core rotates.

I claim:

1. A device of the character described comprising a rotatable core adapted to support a tire carcass, a folding member in the form of a hook having a bead engaging edge, means to position said member adjacent the core with the point of the hook spaced radially inwardly from the edge of the carcass plies and means to move said member to insert the point of the hook between the core and the carcass plies and bring said bead engaging edge against the outer face of the bead portion of the carcass.

2. A device of the character described comprising a rotatable core adapted to support a tire carcass, folding members in the form of hooks having bead engaging edges means to position said members adjacent opposite sides of the core with the points of the hooks spaced radially inwardly from the edges of the carcass plies and means to simultaneously move said members to insert the points of the hooks between the core and the carcass plies and bring said bead engaging edges against the outer faces of the bead portions of the carcass.

3. A device of the character described comprising a rotatable core adapted to support a tire carcass, a support rotatable in the plane of the core, and folding members in the form of hooks, having bead engaging edges, pivoted to said support to swing toward and from the plane of the core.

In testimony whereof I have signed my name to the above specification.

PAUL W. LEHMAN.